Feb. 9, 1926.
W. J. STEWART
1,572,050
GATE FOR POULTRY FEEDING BATTERIES
Filed June 12, 1924
Fig. 1
Fig. 2
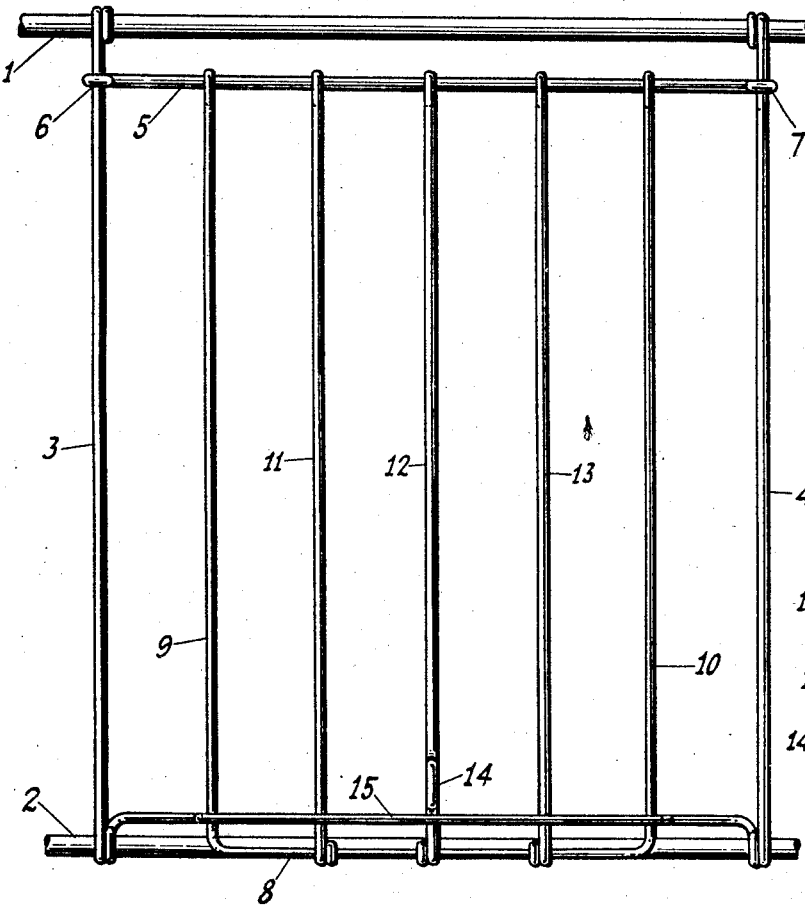
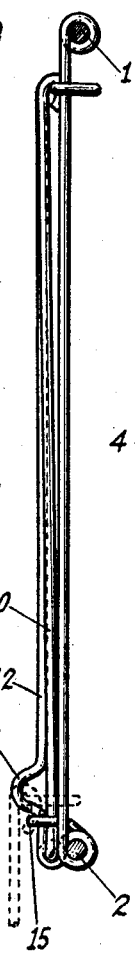
William J. Stewart, Inventor
By Attorneys Dodson & Roe Patented Feb. 9, 1926.

1,572,050

UNITED STATES PATENT OFFICE.

WILLIAM J. STEWART, OF CLINTON, IOWA.

GATE FOR POULTRY-FEEDING BATTERIES.

Application filed June 12, 1924. Serial No. 719,461.

*To all whom it may concern:*

Be it known that I, WILLIAM J. STEWART, a citizen of the United States, residing in the city of Clinton, county of Clinton, and State of Iowa, have invented a certain new and useful Improvement in Gates for Poultry-Feeding Batteries, of which the following is a specification.

My invention relates to that class of gates for batteries such as are described in my Patent Number 1,458,736.

Those familiar with the condition under which these batteries are used, know that they are subject to the greatest abuse and rough usage and it is very necessary to provide a gate which will not get out of order, can be securely and automatically locked and yet which can be quickly and easily opened.

My invention has for its object to provide a gate which is very strong, inexpensive, and which cannot get out of order easily, and has for its further object to provide a gate which will remain closed under all conditions, regardless of rough usage to which it may be subjected, and yet can be easily and quickly opened.

My means of accomplishing the foregoing objects, may be more readily understood by having reference to the accompanying drawings which are hereunto annexed and are a part of this specification, in which Fig. 1 is a front elevation of my improved gate, a fragmentary portion of the poultry feeding battery only being shown, for the reason that it is not part of my invention.

Fig. 2 is a side elevation of the gate shown in Fig. 1.

Similar reference numerals refer to similar parts throughout the entire description.

As shown in the drawings, the horizontal bars 1 and 2 are fragmentary portions of the front wall of the battery (not shown). These bars 1 and 2 are connected by vertical rods 3 and 4 in the usual manner. The top of the gate is formed by a horizontal rod 5, the ends of which are formed into eyes 6 and 7, which are slidable upon the vertical rods 3 and 4. The eyes 6 and 7 are formed large enough to permit a lateral movement upon the rod as well as a sliding one.

The bottom of the gate is formed by the lower part 8 of a U-shaped member, the branches 9 and 10 of which, form the side bars of the gate. A plurality of connecting members 11, 12 and 13 extend from the bottom 8 of the gate to the top 5 being secured thereto in any convenient manner. As illustrated they are simply wound once around the bars 8 and 5, respectively.

The rod 12 is provided with a handle 14, which as shown is formed by bending the wire outwardly forming a loop as clearly seen in Fig. 2. This handle or loop 14 also forms a stop and rests upon a guide 15 which extends horizontally from the rod 3 to the rod 4. This guide 15 is in spaced relation to the front wall of the battery, there being room in said space to permit the gate to slip intermediate the guide and the front wall of the battery until the loop 14 rests upon the guide 15, as shown in Fig. 2.

To open the gate, the operator grasps the handle or loop 14 and slides the gate upwardly on the rods 3 and 4 until the bottom 8 of the gate is above the guide 15, when the gate is moved outwardly, this movement being permitted by the size of the eyes 6 and 7. When the gate crosses the guide the operator releases the gate and it drops as shown in the dotted lines in Fig. 2.

To close the gate, it is slid upwardly on the rods 3 and 4 until the bottom is above guide 15 when it is moved inwardly and released. It then drops into the space between the guide 15 and the front wall of the battery until the loop 14 rests on the guide. The gate is now closed, and to all purposes locked. No amount of kicking or bumping will cause it to fly open, since it has to be lifted bodily out of the space and above the guide before it can be opened.

Having thus described my invention what I regard as new and desire to secure by Letters Patent is:

1. A gate for poultry feeding batteries, comprising the combination with a pair of vertical rods, of a top horizontal member having an eye at each end slidable and movable on said rods, a horizontal bottom member, a plurality of connecting members which connect the top horizontal member to the bottom, a horizontal guide which extends from one of said rods to the other, said guide being located adjacent to the bottom of said gate, and spaced from the front wall of the battery, a stop on said gate which engages the guide when the gate is closed.

2. A gate for poultry feeding batteries, comprising the combination with a pair of vertical rods, of a top horizontal member loosely secured to said rods, a horizontal bottom member, a plurality of connecting members, which connect the top horizontal member to the bottom, a horizontal guide which extends from one of said rods to the other, said guide being located adjacent to the bottom of said gate and spaced from the front wall of the battery, a stop on said gate which engages the guide when the gate is closed.

3. A gate for poultry feeding batteries, comprising the combination with a pair of vertical rods, of a top horizontal member loosely secured to said rods, a U-shaped member the ends of which are secured to the horizontal member, a plurality of connecting members which connect the bottom part of the U-shaped member to the horizontal member, a horizontal guide which extends from one of said rods to the other, a bend on one of said members which engages the guide when the gate is closed.

4. A gate for poultry feeding batteries, comprising a plurality of vertical rods, a top horizontal member having eyes at the end in which said rods are slidably mounted, a U-shaped member the ends of which are secured to the horizontal member, a plurality of connecting members which connect the bottom part of the U-shaped member to the horizontal member, a horizontal guide located adjacent the bottom part of the U-shaped member and spaced from the front wall of the battery, the bottom of the gate being located intermediate said guide and the front wall of the battery when the gate is closed, a coil formed in one of said connecting members which engages the guide to prevent the U-shaped member dropping down into said space beyond a pre-determined point.

WILLIAM J. STEWART.